(12) United States Patent
Ezumi et al.

(10) Patent No.: US 6,193,137 B1
(45) Date of Patent: Feb. 27, 2001

(54) CONSTRUCTIVE BODY AND FRICTION STIR WELDING METHOD

(75) Inventors: Masakuni Ezumi, Kudamatsu; Kinya Aota, Hitachi; Yasuo Ishimaru; Takeshi Kawasaki, both of Kudamatsu, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/121,092

(22) Filed: Jul. 23, 1998

(30) Foreign Application Priority Data

Jul. 23, 1997 (JP) .................................................. 9-196761
Jun. 8, 1998 (JP) ................................................. 10-158797

(51) Int. Cl.[7] .................................................. B23K 20/12
(52) U.S. Cl. ........................................ 228/112.1; 228/212
(58) Field of Search .............................. 228/112.1, 114, 228/212, 2.1, 44.3, 1

(56) References Cited

U.S. PATENT DOCUMENTS

| | | | |
|---|---|---|---|
| 5,460,317 | * | 10/1995 | Thomas et al. ................... 228/112.1 |
| 5,718,366 | * | 2/1998 | Colligan ............................ 228/112.1 |
| 5,813,592 | * | 9/1998 | Midling et al. ................... 228/112.1 |
| 6,050,474 | * | 4/2000 | Aota et al. ........................ 228/112.1 |
| 6,051,325 | * | 4/2000 | Talwar et al. ........................ 428/593 |

FOREIGN PATENT DOCUMENTS

| | | | | |
|---|---|---|---|---|
| 0810055 | * | 12/1997 | (EP) .................................. 228/112.1 |
| 0810056 | * | 12/1997 | (EP) .................................. 228/112.1 |
| 9309164 | * | 12/1997 | (JP) .................................. 228/112.1 |

* cited by examiner

*Primary Examiner*—Samuel M. Heinrich
(74) *Attorney, Agent, or Firm*—Antonelli, Terry, Stout & Kraus, LLP (57) ABSTRACT

In a case where a welding of a member is performed through a friction stir welding, to restrain the generation of a clearance in a portion to be joined by the welding and to provide a joint having a good joining portion, abutting faces of members are formed with slanting surfaces. A friction stir welding is carried out from an upper portion. The welding is carried out with the slanting surfaces resisting the forces produced in forming the welding bead. Since the slanting surfaces are provided, a flow-out of the material in the welding bead can be restrained, and further a bending of the joining portion can be restrained. Further, a tab is arranged at a beginning end and a finish end of the welding and then the welding is carried out starting at one tab and ending at the other tab.

11 Claims, 11 Drawing Sheets

CONSTRUCTIVE BODY AND FRICTION STIR WELDING METHOD

BACKGROUND OF THE INVENTION

The present invention relates to a friction stir welding method and to a joint shape member and a welding method for the producing the same. For example, the present invention relates to a friction stir welding method which is suitable for use in welding members made of an aluminum alloy, such as members employed in forming a car body of a railway car and other structural bodies.

A friction stir welding method is a method in which, by rotating a round-shaped rod (hereinafter referred to as a rotary body), inserting it in a joint between members, and then moving the rotary body along the joint line, the joint is heated, and the material is softened and plastically flows, so that the members are solid-phase joined.

The rotary body comprises a tool having a small diameter portion which is inserted in the joint and a large diameter portion which is positioned outside the joint. The small diameter portion and the large diameter portion are positioned on the same axis. The large diameter portion is rotated. A boundary portion between the small diameter portion and the large diameter portion can be inserted a little into the joint region during the welding.

A welded joint produced by a friction stir welding method can be used to weld abutting members and overlapping members to be joined. The above stated technique is disclosed, for example, in Japanese patent announcement laid-open publication No. 505090 (EP 0615480 B1) and "Welding & Metal Fabrication" (January 1995), pages 13–14 and 16.

Japanese patent laid-open publication No. Hei 9309164 (laid-open date: Dec. 2, 1997) (EP 0797043 A2 (laid-open date: Sep. 24, 1997) relates to a friction stir welding method for welding a hollow member and discloses the welding of a center rib for connecting two sheets using friction stir welding. Further, a concave portion is provided on the sheet face of the joint. Further, this Japanese patent laid-open publication was laid-open after the filing date of a first application (Japanese patent application No. Hei 9-196761 (application date: Jul. 23, 1997) of the present application.

In a friction stir welding method, since the rotary body operating as a joining tool is inserted into the welding zone of the member to be welded, a large force is applied to the member to be welded. In contrast, in a conventional arc welding method, since the welded portion is fused and welded, a force such as occurs during friction welding is not generated. For this reason, in the case where the friction stir welding method is applied to join I-shaped members, which were previously joined by the conventional arc melting method, since a separation occurs in the joint between the members being welded, a good quality weld can not be obtained.

Figure 18:
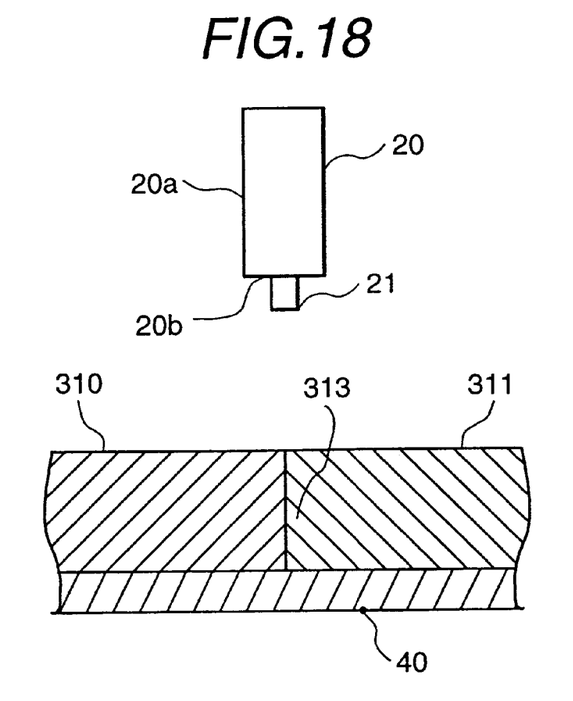
FIG. 18 is a longitudinal cross-sectional view showing a joint to be welded by friction stir welding in a comparison example.

The above circumstances will be explained more specifically with reference to FIG. 18 to FIG. 20. Two members 310 and 311 to be welded (for example, members made of an aluminum alloy) have substantially the same thickness at the edges where they are to be joined and are in parallel with each other, and further have vertical abutting faces 313. Under a condition in which the abutting faces 313 are in contact with each other and in which the two members 310 and 311 are fixed to a bed stand 40, the friction stir welding method is carried out to weld the members 310 and 311 together.

By rotating a rotary body 20, which serves as a welding tool and is comprised of a round shaped rod having a concave shaped small diameter portion 21 at a lower end thereof, the rotating concave shaped small diameter portion 21 can be inserted into the joint between the members. Under this condition, the rotary body 20 is moved along the joint between the abutting faces 313 of the two members 310 and 311, causing the two members 310 and 311 to be welded.

A substantially flat boundary portion 20b, formed between the small diameter portion 21 and a large diameter portion 20a, limits the distance that the small diameter portion 21 can extend into the two members 310 and 311. Since the length of the small diameter portion 21 is smaller than the thickness of the two members 310 and 311, the welding is carried out only on the upper face of the two members 310 and 311. Namely, a non-penetration type friction stir welding method is carried out.

Figure 19:
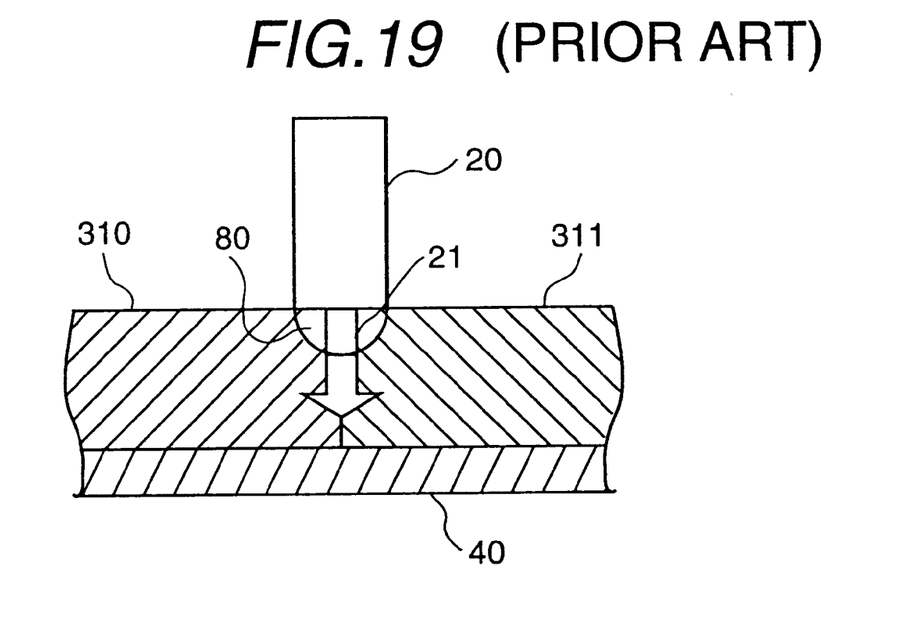
FIG. 19 is a longitudinal cross-sectional view showing a joint during the friction stir welding in FIG. 18.

In FIG. 19, in the vicinity of the rotary body 20, a plastic flow condition exists. A plastic flow of material in a plastic flow area 30 attempts to discharge to the surface, but such movement, for the most part, is restrained by the boundary portion 20b. As a result, at the abutting faces 313 of the two members 310 and 311, a force is applied in a downward direction and a lateral direction. Accordingly, the plastic flow of material in the plastic flow area 30 is pushed downward toward a lower portion of the joint between the abutting faces 313, so that the space between the abutting faces 313 is enlarged by the lateral force.

Figure 20:
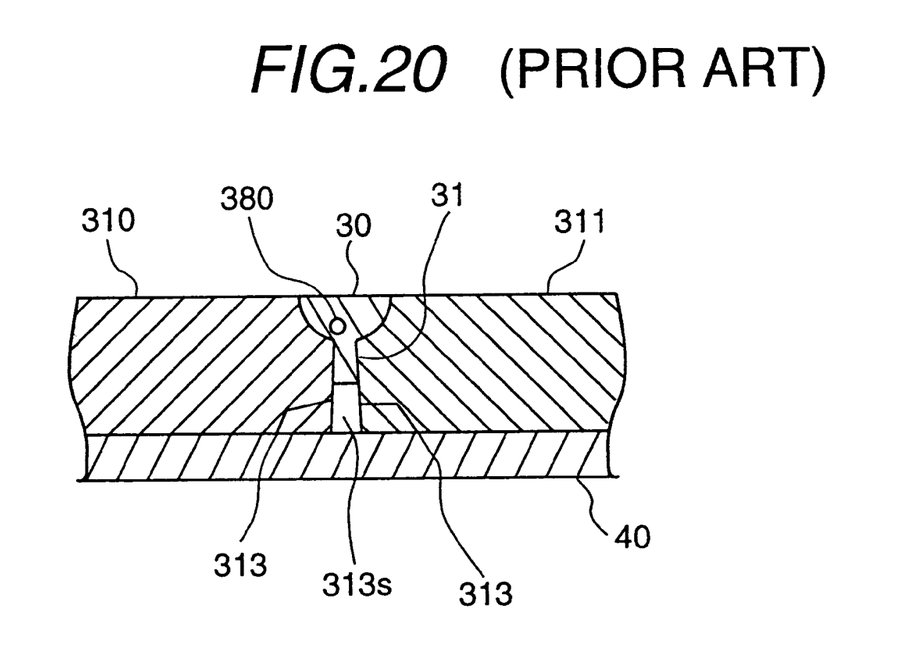
FIG. 20 is a longitudinal cross-sectional view showing the welded joint after the friction stir welding in FIG. 18.

As shown in FIG. 20, the plastic flow of material 31 flows downward from the lower portion of the plastic flow area 30, and an enlarged clearance 313s is produced at the lower portion. Further, the volume of the plastic flow material 31 which flows downward from the plastic flow area 30 is insufficient to fill the clearance, and so voids 380 representing a defect are created in the plastic flow area 30. Therefore, a normal weld can not be produced. Further, the plastic flow area shows a substantial welding bead 30.

The inventors of the present invention have discovered the above stated phenomenon through various experiments. In the above stated non-penetration type welding method on I-shaped joint shape members, in a case where a clearance formed between the abutting faces 313 before the welding is more than 0.2 mm, it was found that a good welding can not carried out.

Further, friction stir welding is carried out on the basis of a premise that the clearance formed between the abutting faces 313 is extremely small, as stated above. A large scale structural body, such as a car body of a railway car, in a case where friction stir welding is carried out on extruded frame members of about 25 m in length, the clearance becomes large due to inaccuracies in the extruded frame member, and, as a result, it is difficult to carry out welding on such members.

Further, in a case where the welding is carried out on hollow members, the face of the sheet becomes dented, and, therefore, it is impossible to carry out a good welding. Further, at a start point of the welding, it is difficult to carry out a good welding. Also, at a finish point of the welding, it is difficult to carry out a good welding.

SUMMARY OF THE INVENTION

A first object of the present invention is to effect a good friction stir welding of members.

A second object of the present invention is to suitably weld a member, such as a hollow member.

A third object of the present invention is to obtain a member, such as a hollow shape member, having a lightweight structure.

A fourth object of the present invention is to carry out a good welding at a start point and a finish point of the welding.

The above stated first object can be attained by providing a slanting surface on an abutting face of two members to be welded and by welding in the vicinity of that slanting surface using a friction stir welding method.

The above stated second object can be attained by providing a V-shaped projecting portion at an end portion of one of the hollow members and by providing a recessed portion into which said projecting portion may enter at another of the hollow members.

The above stated third object can be attained by friction stir welding using a rotary body which has a diameter larger than the space formed between a rib for connecting two sheets of one of the hollow members and a rib for connecting said two sheets of another of said hollow members.

The above stated fourth object can be attained by arranging a tab at a start point and at a finish point of the welding and by welding a structural body including said tab.

DESCRIPTION OF THE INVENTION

Various embodiments of the present invention will be explained with reference to FIG. 1 to FIG. 9, wherein the material for each of the metal members 10 and 11, representing members to be welded, is an aluminum alloy, for example. Each of the metal members can be used in the manufacture of a car body of a railway car, such as shown in FIG. 10.

The embodiment shown in FIG. 1 and FIG. 2 will be explained. Slanting surfaces 12 are provided on the abutting faces of the members 10 and 11 (for example, made of an aluminum alloy) to be welded. Above the abutting portion at the upper face of the members 10 and 11, the center of the small diameter portion 21 of a rotary body 20 is positioned.

The rotary body 20 includes the small diameter portion 21 extending coaxially from a tip end of a rod 20a having a large diameter. The welding is carried out by rotating the rotary body 20, inserting the small diameter portion 21 of the rotary body 20 into the joint between the members 10 and moving 11 and the rotary body 20 along the joint line.

A boundary portion 20b between the large diameter portion 20a and the small diameter portion 21 of the rotary body 20 is indented toward the large diameter portion 20a side and has a circular arc shape. The small diameter portion 21 is formed with a screw member. During welding, the axis of the rotary body 20 is inclined backward relative to the moving direction of the rotary body 20 along the joint line. As a result, a back end of the boundary portion 20b penetrates into the members 10 and 11, but a front end thereof is positioned above the surface of the members 10 and 11. The above stated "back end" and "front end" are established by the moving direction of the rotary body 20. The tip end of the small diameter portion 21 does not completely penetrate the members 10 and 11.

In order to carry out the welding, the members 10 and 11 are pushed down and pressed from an upper portion against a bed stand 40 by a vise or similar apparatus to fix or secure the members in position. The interval in a horizontal direction between the members 10 and 11 is made small so that the slanting surfaces are in close contact or the clearance between the abutting faces is made as small as possible.

Figure 1:
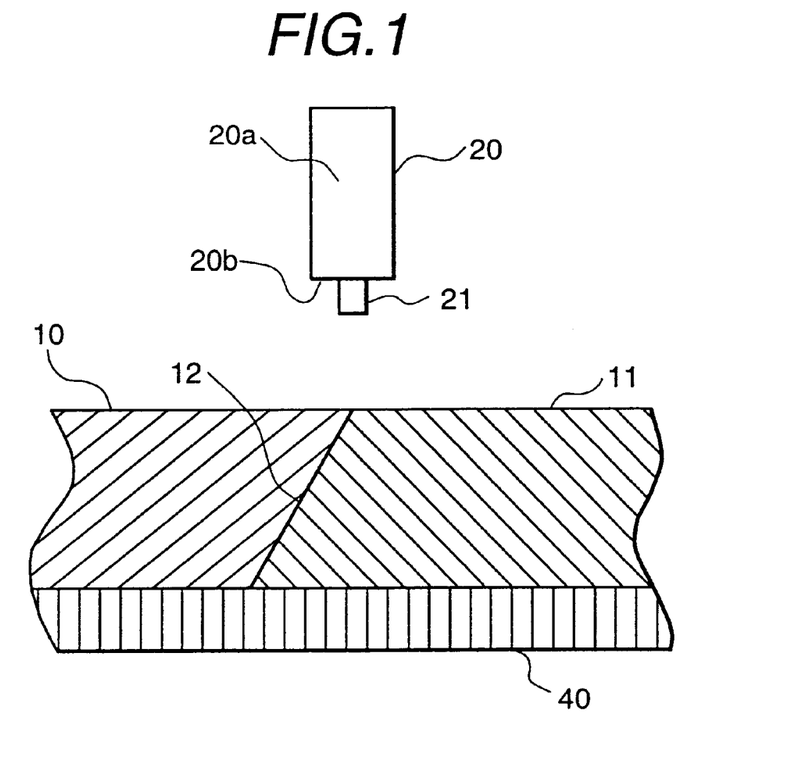
FIG. 1 is a longitudinal cross-sectional view showing one embodiment of a joint to be welded by friction stir welding according to the present invention.
Figure 2:
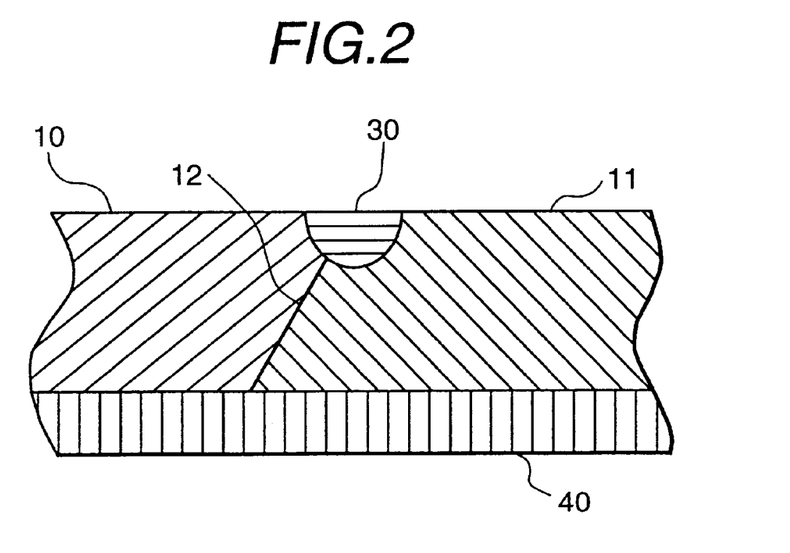
FIG. 2 is a longitudinal cross-sectional view showing the welded joint after the friction stir welding in FIG. 1.

The close contact between the slanting surfaces 12 is carried out by pressing the member 10 toward the member 11 (in FIG. 1, a left and right direction). During the welding, a left side and a right side of the rotary body 20 are pressed toward the bed stand 40 from the upper portion. Since the slanting surfaces 12 are substantially, a plastic flow of material flowing to a lower portion of the joint can be restrained. As a result, the generation of a clearance due to lateral pressure and the flow of material in the joint can be restrained, and so it is possible to carry out a good friction stir welding, as shown in FIG. 2.

Reference numeral 30 denotes a welding bead produced by the friction stir welding. The configuration of the welding bead 30 as shown in FIG. 2 is illustrated schematically. The welding bead 30 at the upper portion of member 10 is supported by the slanting surface 12 of the lower portion of member 11. As a result, the member 10 in the vicinity of the welding bead 30 does not bend in response to a large vertical force which is produced during the friction stir welding. This will be understood easily by removing the slanting surface 12 from the member 11.

Further, since the slanting surface 12 is provided, the member 11 can not be positioned at the upper portion against the member 10, accordingly a slip-off of an upper face height can be lessened. In particular, in a case where the slanting surfaces 12 of the members 10 and 11 are in close contact, a large effect can be expected.

With the above stated construction, for example, even in a case where the clearance of the abutting faces before the welding is more than 0.2 mm, a good welding can be carried out. A structural body is formed by welding the two members 10 and 11.

Figure 5:
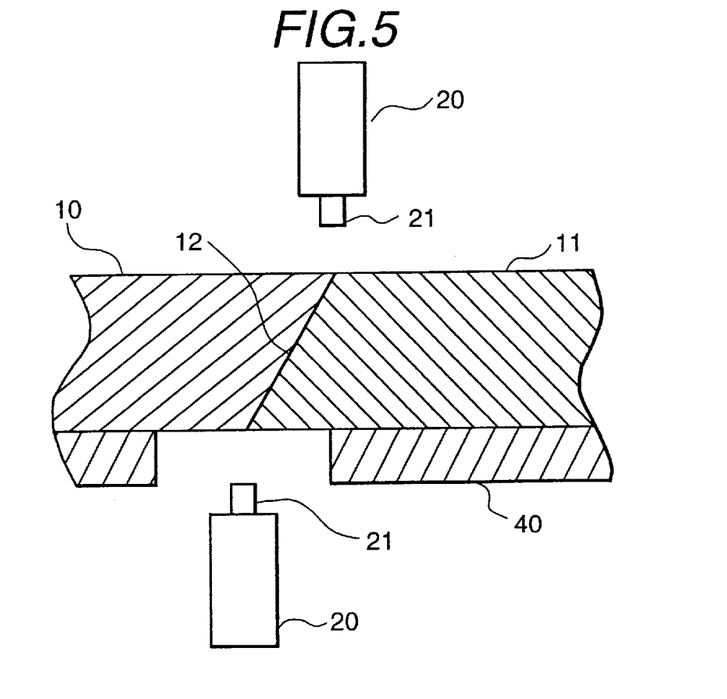
FIG. 5 is a longitudinal cross-sectional view showing a further embodiment of a joint to be welded by friction stir welding according to the present invention.

The slanting surface 12 may be formed in a straight line or as a circular arc having a concave portion a little at the upper portion. The welding of the lower portion of the abutting faces is carried out by reversing the members or by using an arrangement as shown in FIG. 5.

Figure 3:
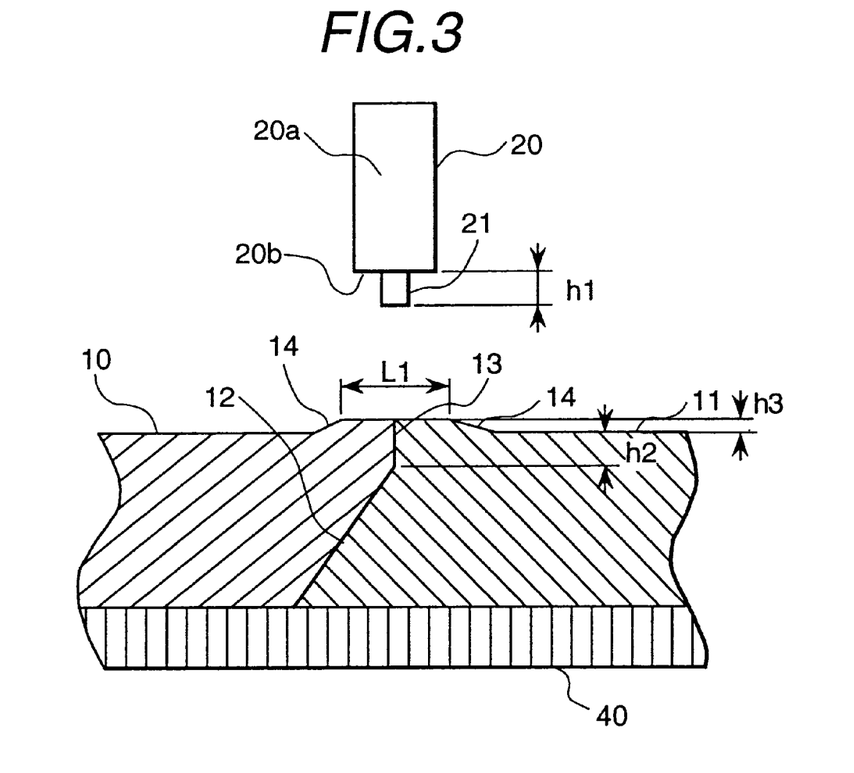
FIG. 3 is a longitudinal cross-sectional view showing another embodiment of a joint to be welded by friction stir welding according to the present invention.
Figure 4:
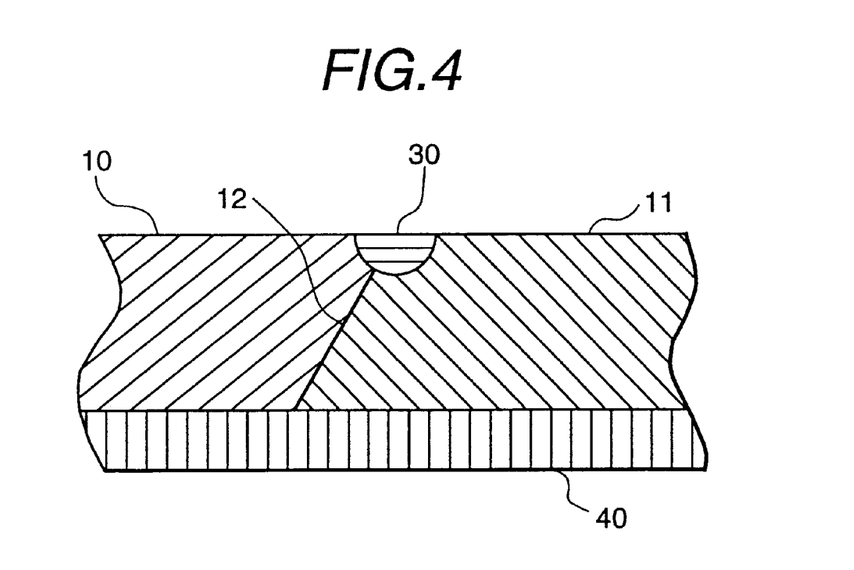
FIG. 4 is a longitudinal cross-sectional view showing the welded joint after the friction stir welding in FIG. 3.

In an embodiment shown in FIG. 3 and FIG. 4, the abutting faces of the joint between members 10 and 11, which are to be joined by the friction stir welding method, are formed with an upper vertical face portion 13 and a lower face portion which is formed as a slanting surface 12. The slanting surface portion 12 is provided at a lower portion so as to extend at least from the welding bead 30. In this regard, it is desirable for the slanting surface portion 12 to contact the welding bead 30. The vertical face portion 13 is orthogonal to the faces of the upper surfaces of the members 10 and 11.

Further, at an upper portion of the vertical face 13, projecting portions 14 are provided on each of the members 10 and 11, and such a projecting portion extends, as seen in FIG. 3, from the upper faces of the members 10 and 11. The projecting portions 14 have a trapezoidal shape, as shown in FIG. 3, when the two projecting portions 14 are abutted. During the welding, the boundary portion 20b of the rotary body 20 is positioned at an outside portion from the outer face of a nonprojecting portion of the members 10 and 11. Namely the boundary portion 20b is positioned between an apex of the projecting portion 14 and the non-projecting portion of the members 10 and 11, namely, the boundary portion 20b is positioned within the projecting portion 14.

The front end in the moving direction of the rotary body 20 is positioned at an upper portion relative to the upper faces of the projecting portions 14. During welding, the tip end (in FIG. 3, a lower end) of the small diameter portion 21 extends at least to an upper end of the slanting surface portion 12, since $h_2 \leq h_1$.

With the above stated construction, compared with the case of FIG. 1, since the welding portion (the welding bead 30) is located in the vertical face portion of the joint, the welding portion can be formed symmetrically with the small diameter portion 21 at a center. Further, even in a case where the clearance formed between the members 10 and 11 is large, since the projecting portions 14 are provided, the material which contributes to the plastic fluid flow in the projecting portions 14 flows out to fill the clearance at the vertical faces 13. As a result, no empty voids occur in the welding bead 30.

In a case where the end portions of the members 10 and 11 are abutted, size control is carried out even when the vertical faces 13 are not in complete contact with each other, since the slanting surfaces 12 are in contact with each other or closely approach each other. Further, during the welding, a height position of the boundary portion 20b between the small diameter portion 21 and the large diameter portion 20a of the rotary body 20 is located within the range of a height h3. Namely, the center of the projecting portion 14 is positioned at the vertical face 13. The width L1 between the ends of the two projecting portions 14 is larger than the diameter of the large diameter portion 20a of the rotary body 20. This is of interest in a case where the position of the small diameter portion 21 has slipped off the vertical face 13.

After the friction stir welding is carried out, any parts of the projecting portions 14 which remain on the outer sides of the car body of the railway car are cut off. Since the height position of the boundary portion 20b of the rotary body 20 is positioned in the projecting portion 14 as stated above, a cutting size is established. As a result, when the projecting portions 14 are cut off, a plane face is provided with no dent portion. Accordingly, it is desirable to arrange the projecting portion 14 on the outer side of the car body.

By action of the rotary body 20, the metals of the projecting portions 14 are moved into the clearance between the vertical faces 13, and so the clearance is filled in. As a result, the inventors have confirmed by experimentation that a tolerance value of the clearance between the vertical faces 13 before the welding can be as large as about 1 mm for an aluminum alloy member.

During the welding, even when the position of the lower end or tip of the small diameter portion 21 is positioned at a lower end of the vertical face 13 at the point of interconnection between the slanting surface 12 and the vertical face 13 of the abutting faces of the members 10 and 11, a good welding can be carried out.

In an embodiment shown in FIG. 5, the friction stir welding is carried out simultaneously on the members 10 and 11 of the embodiment shown in FIG. 1 from both the upper face and the lower face. At the abutting portion on the upper face of the members 10 and 11, the center of the small diameter portion 21 of an upper rotary body 20 is positioned. At an abutting portion on the lower face of the members 10 and 11, the center of the small diameter portion 21 of a lower rotary body 20 is positioned. The small diameter portion 21 of the lower rotary body 20 is directed toward the upper portion.

Under a condition in which the positions in the moving directions of the two rotary bodies 20 along the joint line are the same, the two rotary bodies 20 are moved at the same speed while friction stir welding is carried out. Namely, an operation point of a load (a force for inserting the rotary body 20 into the joint) produced by the upper rotary body 20 and an operation point of a load produced by the lower rotary body 20 are made to by substantially in alignment. Therefore, a bending of the members 10 and 11 is prevented. No bed stand 40 is needed to provide support for the members 11 and 12 against the force produced by the lower rotary body 20. A bed stand 40 is positioned only to support the members 11 and 12 against the force produced by the upper rotary body 20.

In the welding at the lower portion, since the joining portion of the member 11 is supported through the slanting surface of the member 11, any bending of this portion can be restrained.

Figure 6:
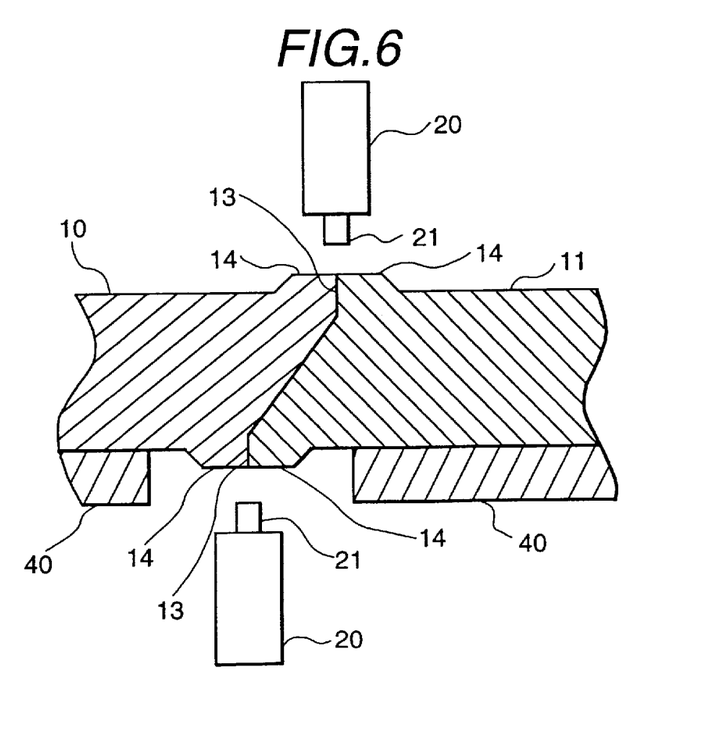
FIG. 6 is a longitudinal cross-sectional view showing a further embodiment of a joint to be welded by friction stir welding according to the present invention.

In an embodiment shown in FIG. 6, the abutting faces of the joint on the upper side and the lower side of the members 10 and 11 are formed by vertical faces 13. In the vertical direction, the upper portion vertical face 13 and the lower portion vertical face 13 are not in alignment. Both vertical faces are connected by a slanting surface 12.

Figure 7:
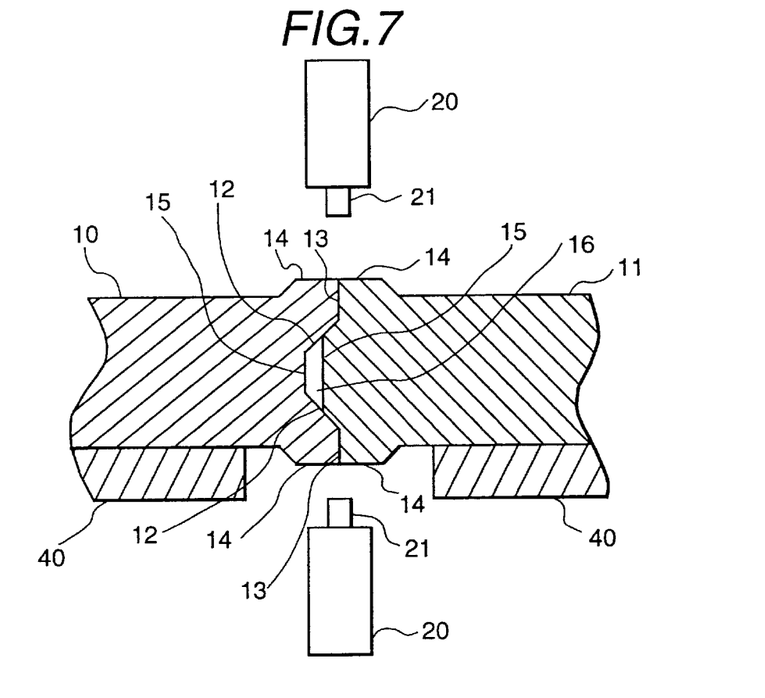
FIG. 7 is a longitudinal cross-sectional view showing a further embodiment of a joint to be welded by friction stir welding according to the present invention.

In an embodiment shown in FIG. 7, the abutting faces of the joint on the upper side and the lower side of the members 10 and 11 are formed with vertical faces 13; however, in this embodiment, the lower portion vertical faces 13 are positioned on an extension line of the upper vertical faces 13. The abutting faces, between the upper and lower vertical faces 13, are formed with slanting surfaces 12. In this regard, end surface of the member 11 may be formed with a V-shape concave portion and an end surface of the member 10 may be formed with V-shape projecting portion, although this is not specifically shown in FIG. 7.

In a case where the end portions of the members 10 and 11 are abutted, dimension control can be carried out even when the vertical faces do not completely contact each other, since the slanting surfaces 12 are in contact with each other or closely approach each other. For example, the interval of the slanting surfaces 12 of the projecting portion is set to be smaller than the interval of the slanting surfaces 12 of the concave portion.

With the above stated construction, since the lower rotary body 20 is substantially positioned in alignment with the lower portion of the upper rotary body 20, a bending of the members 10 and 11 can be lessened further. Also, by provision of the V-shaped slanting surfaces 12, any tendency of the members 10 and 11 to slip-off toward the upper and the lower directions can be prevented. As a result, a good friction stir welding can be obtained.

Further, the bottom portion of the V-shaped projecting portion of the member 10 and the apex of the V-shaped concave portion of the member 11 need not be provided, but a trapezoid shaped structure may be formed, as more specifically shown in FIG. 7. In such case, a clearance 16 is provided between vertical faces 15 of the members 10 and 11. With this construction, good contact by the upper and the lower vertical faces 13 can be formed easily.

Figure 21:
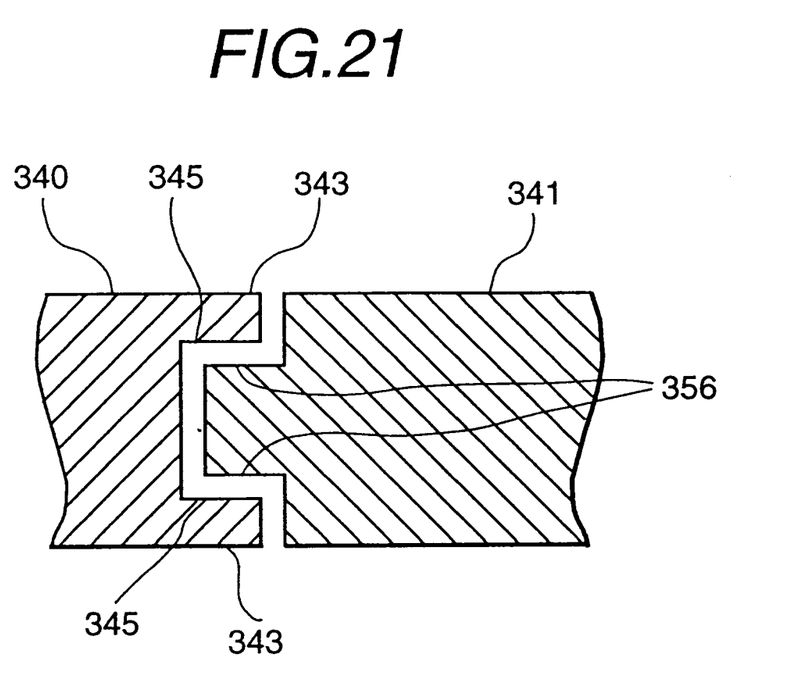
FIG. 21 is a longitudinal cross-sectional view showing a joint after friction stir welding in the comparison example.

By the provision of the slanting surfaces 12 of the members 10 and 11, the flow-out of metals during the friction stir welding can be prevented. On the other hand, as shown in FIG. 21, as a construction equivalent to the slanting surfaces 12, it is possible to provide faces 345 and 346 in parallel to the outer faces of members 340 and 341, and by these faces, the flow-out of metals also is prevented. However, it is necessary to make the interval between the faces 345 of the member 340 larger than the interval between the faces 356 of the member 341, with the result that a clearance is formed between the faces 345 and the faces 356. Thus, the plastic flow of metal flows out to this clearance, and so a defect is likely to occur. Or, flanges 343 of the member 340 can be formed to bend toward an inner side.

In a case where the projecting portion 14 is not provided, a bend can be seen. In a case where the projecting portion 14 is provided, it is necessary to make the projecting portion 14 large under the consideration of the above stated clearance, and so the product becomes high in cost. In the embodiment shown in FIG. 7, in a case where the interval between the members 10 and 11 is made remote, a similar thing may occur, but since the slanting surfaces are provided, it is made stronger from a strength aspect, and, as a result, bending of the end portion of the member 10 becomes less likely.

As stated above, in the frame member of FIG. 21, two clearances are easily produced. One of the two clearances is a clearance between the faces 345 and 356. The other of the two clearances is a clearance between a tip end (a vertical face) of the flange 343 and a joining face (a vertical face) of the member 341. These two clearances give a big affect to the friction stir welding. This is taken into consideration, in particular in the embodiment shown in FIG. 7 to FIG. 13. Namely, since the slanting surfaces 12 are in contact with each other, the only clearance is the clearance of the vertical faces 13, and, as a result, the welding condition can be made good.

In the embodiment shown in FIG. 8 to FIG. 15, an application of the present invention to the manufacture of a car body of a railway car is shown. In FIG. 10, the car body of the railway car is constituted by a side body member 50, which constitutes a side face of the car body, an upper face roof body member 51, a lower face floor body member 52, and an end body member 53.

The side body member 50 is constituted by arranging in parallel plural extruded frame members 60 and 70 and by welding an abutting portion of those members using friction stir welding. Each of the roof body member 51 and the floor body member 52 is constituted similarly to the side body member 50. The welding between the side body member 50 and the roof body member 51 and the welding between the side body member 50 and the floor body member 51 are carried out using MIG (metal electrode inert gas) welding, for example.

Figure 8:
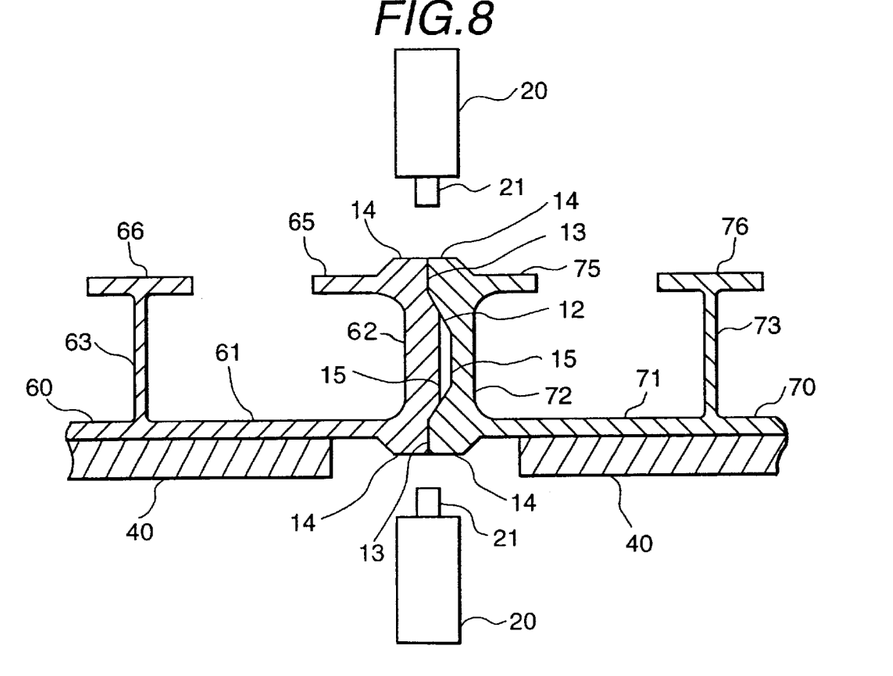
FIG. 8 is a longitudinal cross-sectional view showing a further embodiment of a joint to be welded by friction stir welding according to the present invention.
Figure 9:
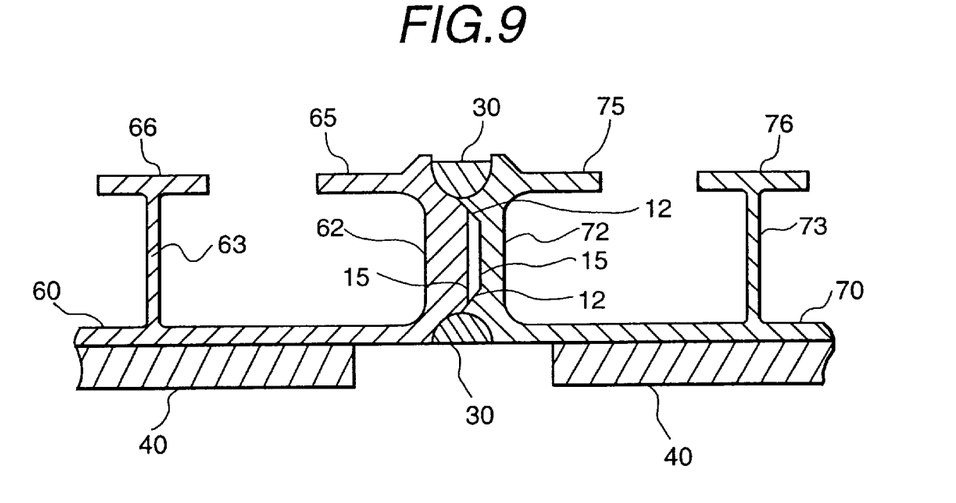
FIG. 9 is a longitudinal cross-sectional view showing the welded joint after the friction stir welding in FIG. 8.
Figure 10:
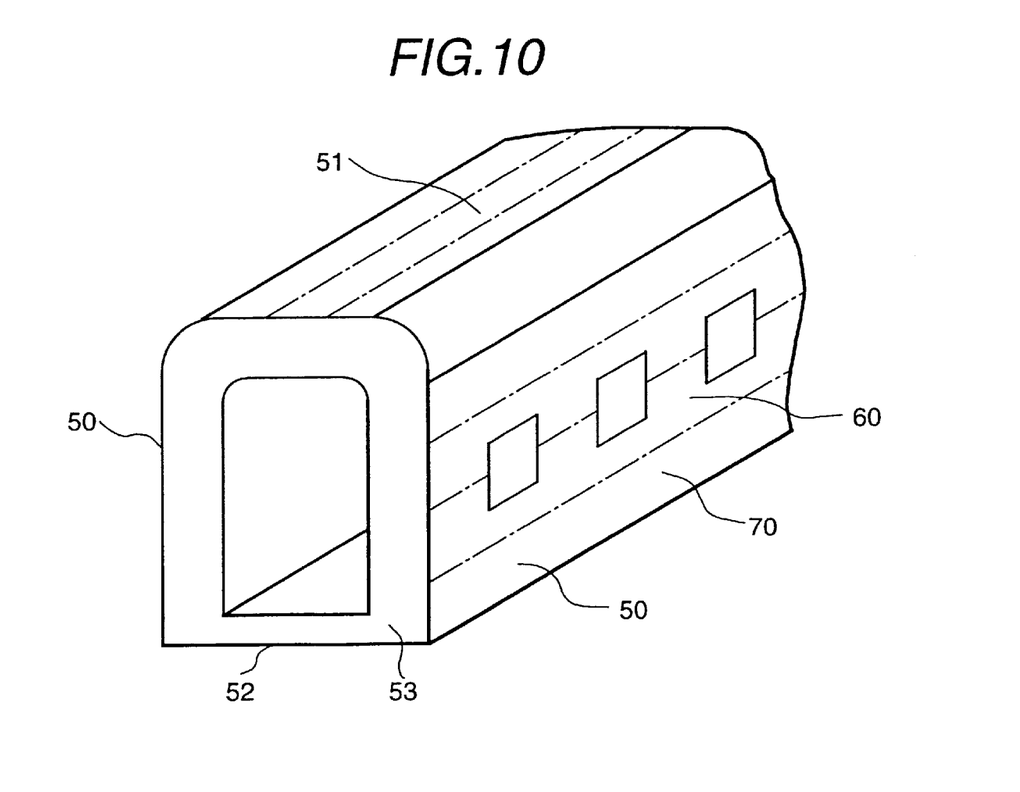
FIG. 10 is a perspective view showing one embodiment of a car body of a railway car in which the present invention is adopted.

In FIG. 8 and FIG. 9, the extruded frame members 60 and 70 correspond to the members 10 and 11 of an embodiment shown in FIG. 1 to FIG. 7, respectively. The extruded frame members 60 and 70 are comprised of faces plates 61 and 71, which constitute the outer face of the car body, plural ribs 62, 63 and 72, 73 at a car inner side, and face sheets 65, 66 and 75, 76 which are provided at tip portions of the ribs. Plural ribs 63 and 73 and plural face sheets 66 and 76 are provided at spaced positions along the length of the extruded frame members 60 and 70.

To the face sheets 65, 66 and 75, 76, a post (in the case of the side body member 50, not shown), a rafter (in the case of the roof body member 51, not shown), a lateral beam (in the case of the floor body member 52, not shown), and seats for various components are welded. The configuration of the joint shape member is substantially similar to that of FIG. 7. As in the embodiment shown in FIG. 7, friction stir welding is carried out simultaneously on both upper and lower faces. A roller (not shown) for supporting the upper rotary body 20 is mounted on the face sheets 65 and 75.

One end of the frame member 60 has a concave trapezoidal shape and one end of the frame member 70 has a projecting trapezoidal shape. The other end of the frame member 60 has the shape of the above stated one end of the frame member 70 or the shape of the above stated one end of the frame member 60, so that the two frame members are capable of engaging with one another at the ends thereof.

The extruded frame members 60 and 70 have two-plane structures as stated above. One of the planes corresponds to the face sheets 61 and 71 and the other one of the planes corresponds to face sheets 65, 66 and 75 and 76. In the above stated two-plane structure, in a case where friction stir welding is carried out from the outer side, there is a tendency for the face sheets of the joining portion to bend toward the side of the other face sheets in response to the vertical load produced during the welding. However, in the joint members shown in FIG. 8, since the end portion of the extruded frame member 60 has the rib 62 and friction stir welding is carried out on the upper portion and the lower portion of this end portion, bends do not occur in the joining portion of the frame members 60 and 70. Namely, the rib 62 works as a support member for receiving the vertical load during the friction stir welding. This results from the fact that the rib 62 is located on a line connecting the vertical faces 13, of the members 60 and 70.

On the other hand, since the frame member 70 is supported on the slanting surface of rib 62 and the rib 72 is positioned in the vicinity of the joining portion, bending does not occur at the joining portion of the frame member 70. These facts will be understood by comparing this structure with the structure shown in FIG. 19. Namely, the vertical faces 13 are positioned along an extension line of the plate thickness of the rib 62. In the above stated arrangement, at least parts of the welding beads 30 are positioned along the same extension line.

The above stated joint shape member can be used to form a hollow extruded frame member to which the face sheets 65, 66 (75, 76, 77) are connected. After the manufacture of the side body member 50, the projecting portion 14 is cut off, and the outer face is made into a flat smooth structure. It is not always necessary to cut off the projecting portion on the inner side of the car.

Next, a finishing operation may be carried out, such as painting, but this embodiment will be explained for a case where painting is not carried out. After that, a hair line finish, or a transparent painting finish, is applied. Since friction stir welding is carried out, the quality of the joint can not be confirmed through mere visual observation, in contrast with MIG welding. As a result, a texture can be seen, but a good appearance of the side body member can be obtained at a low cost. The welding portions of the side body member 50, the roof body member 51, the floor body member 52, and the end body member 53 are positioned at a position which is difficult to see from the side.

A joint of one extruded frame member having a two-plane constructive body will be explained with reference to FIG. 11 and FIG. 12. An extruded frame member 100 (110) comprises two substantially parallel face sheets 101 and 102 (111 and 112), plural ribs 103 and 106 (113 and 116) for connecting the two face sheets, and a projecting portion 104 (114) which extends outward from the frame members 100 (110) in an end portion where the members are joined. The extruded frame member 110 further has projecting parts 117 which extend toward the opposing frame member 100 from the end rib 116.

The plural ribs 103 and 113 are provided at spaced positions along the length of the frame members 100 and 110. The rib 103 (113) is provided so as to be inclined relative to the face sheets 101 and 102 (111 and 112). The rib 106 (116) is provided so as to be orthogonal to the face sheets 101 and 102 (111 and 112). Each of reference numerals 109 and 119 denotes a hollow portion.

On the end portions of the frame members 100 and 110, vertical faces 121 and slanting surfaces 122 are provided. The vertical faces 121 are positioned at the end portions of the face sheets 101, 102 and 111, 112. The slanting surface 122 of the frame member 110 is positioned on the face sheet side of the projecting part 117. The slanting surface 122 of the frame member 100 is positioned to face inwardly so as to engage with the projecting part 117. The slanting surface 122 is inclined from the position of the vertical face 121 of the frame member 110.

The projecting part 117 is projected toward the frame member 100. The projecting portions 104 and 114 are positioned at the end portions of the respective face sheets 101, 102 and 111, 112. The rib 116 of the frame member 110 is positioned on the extension line of the joint. On the assumption that the axial center of the rotary body 20 is positioned on the extension line of the center of the rib 116, the vertical faces 121 of the frame members 100 and 110 are positioned off of the little a center from the center line of the rib 116.

The two vertical faces 121 are parallel to the extension line through the center of the rib 116. The plate thickness of the rib 116 is thicker than the plate thickness of the rib 106.

In a case where, by assembling the frame members 100 and 110, the slanting surfaces 122 are in contact with each other, some clearance between the vertical face 121 of the frame member 100 and the vertical face 121 of the frame member 110 provided. For example, an interval between the inwardly directed slanting surfaces 122 of the member 100 is provided to be smaller than the interval between the outwardly directed slanting surfaces 122 of the member 110. Or, the clearance between the slanting surfaces 122 on the respective members is provided to be small.

Since the rib 106 is provided on the frame member 100, the thickness of the projecting portions 104 and the slanting surfaces 122 can be manufactured easily and with improved accuracy at the end portions. Since, at the connecting portion between the slanting surface 122 and the rib 106 of the frame member 100 a hollow portion which is spaced from the extension line of the slope 122 is provided, the cross-sectional area of the end portion of the frame member 100 can be made small and a light weight structure can be obtained.

Figure 13:
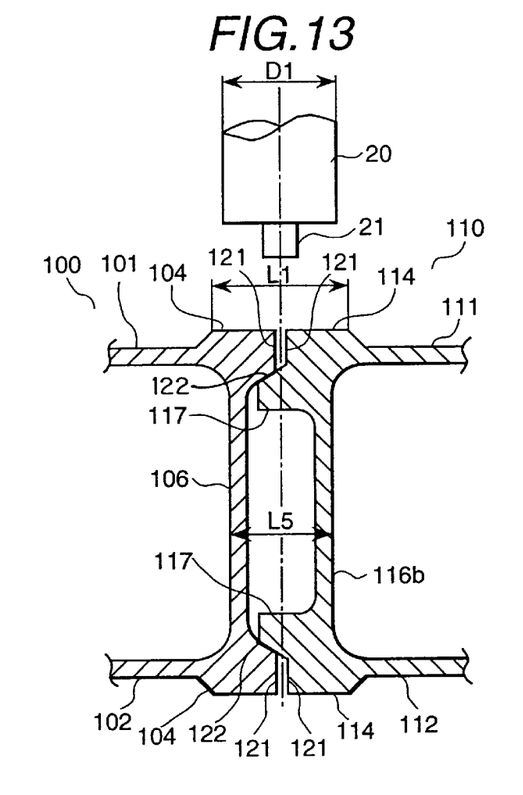
FIG. 13 is a longitudinal cross-sectional view showing a further embodiment of a joint to be welded by friction stir welding before welding thereof according to the present invention.

In an embodiment shown in FIG. 13, the abutting portion is positioned at an intermediate position between the rib 106 and a rib 116*b*. The distance from the vertical face 121 to the rib 106 of the frame member 100 is substantially the same as the distance from the vertical face 121 to the rib 116*b* of the frame member 110. The plate thickness of the two ribs 106 and 116*b* is the same. The interval L5 between the two ribs 106 and 116*b* is larger than the diameter of the small diameter portion 21, but is smaller than the diameter D1 of the large diameter portion 20. The width (the same in the width direction of the frame member) of the projecting portion 104 is the same as the width of the projecting portion 114.

The vertical faces 121 are detected by an optical sensor, and by positioning the axial center of the rotary body 20 at an intermediate position between the vertical faces 121, the friction stir welding is carried out. As a result, the axial center of the rotary body 20 is positioned at an intermediate position between the two ribs 106 and 116*b*. Further, the axial center of the rotary body 20 is positioned at the intermediate position between the projecting portions 104 and 114. Thus, the center of the welding bead is positioned at the intermediate position between the two ribs 106 and 116. The size and the position of the rotary body 20 and other constructions are similar to the above stated embodiments.

Figure 12:
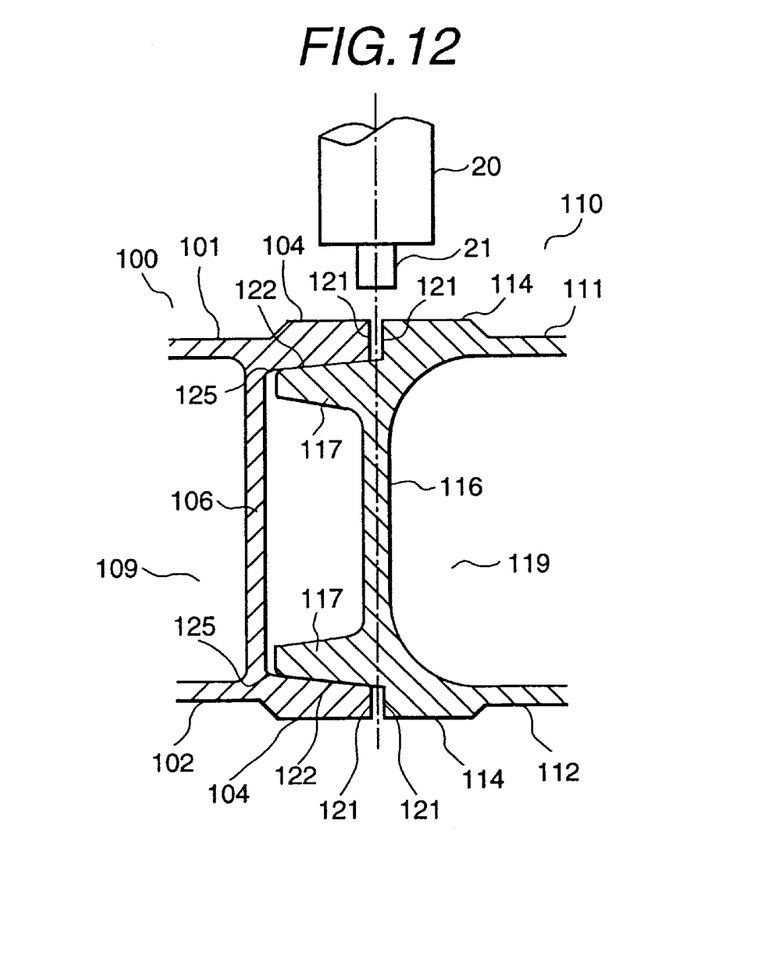
FIG. 12 is a longitudinal cross-sectional view showing an essential portion of the joint before welding according to the present invention.

With the above construction, since the load during welding is supported by the two ribs 106 and 116b, the plate thickness of the rib 116b can be formed to be thinner than that of the embodiment shown in FIG. 12. Thus, the total value of the plate thickness of the two ribs 106 and 116b can be made smaller than that of the embodiment shown in FIG. 12. As a result, a light weight structure can be attained.

Further, in the embodiment shown in FIG. 12, with respect to the two ribs 106 and 116, since the load is applied concentrically to the rib 116, the rib 116 is more easily bent. However, in the embodiment shown in FIG. 13, the two ribs 106 and 116b receive substantially the same load, and so bending deformation of the ribs 106 and 116b will hardly occur. It is preferable to make the distance from the rib 106 to the axial center of the rotary body 20 substantially equal to the distance from the rib 116 to the axial center of the rotary body 20. The interval L5 between the two ribs 106 and 116b is smaller than the diameter D1 of the large diameter portion 20a of the rotary body 20. As a result, the load by the large diameter portion 20a is applied equally to both ribs 106 and 116b, and therefore the bending deformation of the face sheets 101 and 111 can be kept small.

In consideration of possible error in the position of the rotary body 20, the combined width L1 of the projecting portions 104 and 114 is made larger than the diameter D1 of the large diameter portion 20a (L1>D1). Further, when the friction stir welding is finished, the welding bead is formed to be a little large owing to the large diameter portion 20a and the small diameter portion 21.

After that, one face or both faces of the projecting portions 104 and 114 is cut off along the surface of the face sheets 101, 111, 102 and 112. To the remaining projecting portions 104 and 114, the welding bead of the large diameter portion 20a is left. The size (the diameter) of this welding bead is larger than the interval (L5). It can be seen that the center of the welding bead will exist substantially at the center of the two ribs 106 and 116b.

Further, in the frame members 100 and 110 before the welding, a distance (≈L5/2) from the vertical faces 121 to the ribs 106 and 116b is smaller than the combined width (≈L1/2) of the projecting portions 104 and 114. The ribs 106 and 116b are exist at another end side in the width direction of the frame member from the vertical faces 121. The diameter D1 of the large diameter portion 20a, the size of the welding bead according to the large diameter portion 20a, the position of the ribs 106 and 116b stated above exist in a range of the projecting portions 104 and 114 in the width direction of the frame members 100 and 110. The frame members 100 and 110 have slanting surfaces 122, but when the projecting parts 117 are provided, it is possible to employ the prior art structure shown in FIG. 21.

Figure 14:
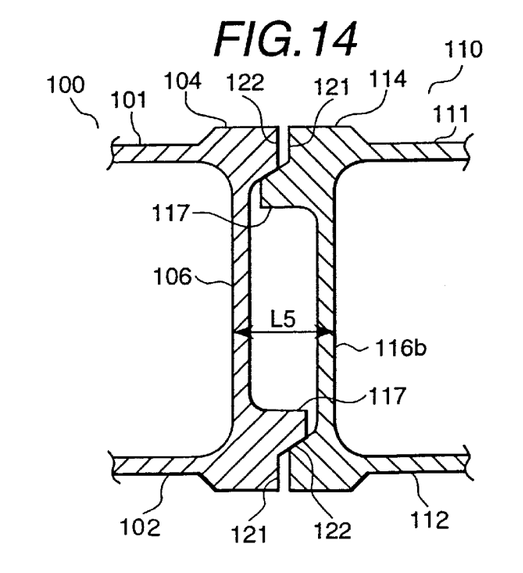
FIG. 14 is a longitudinal cross-sectional view showing a further embodiment of a joint to be welded by friction stir welding before welding thereof according to the present invention.

In an embodiment shown in FIG. 14, in comparison with the embodiment shown in FIG. 13, the projecting part 117 at the side of the plate face 112 is provided instead at a side of the rib 106 on the plate face 102.

Figure 15:
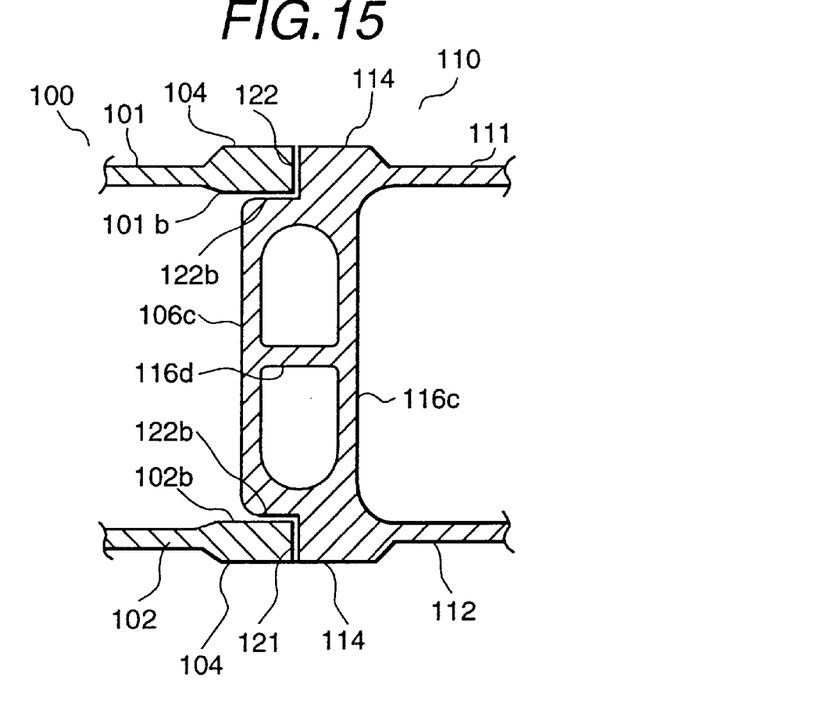
FIG. 15 is a longitudinal cross-sectional view showing a further embodiment of a joint to be welded by friction stir welding before welding thereof according to the present invention.

In an embodiment shown in FIG. 15, two ribs 106c and 116c are provided on the frame member 110. Along a line which extends between the two ribs 106c and 116c, the end portions of the face sheets 101, 102 and 111, 112 of the two frame members 100 and 110 are joined. The two ribs 106c and 116c support the load applied by the rotary body 20. The rib 106c and the rib 116c are connected through a rib 116d. With this construction, the bending of the ribs 106 and 116c during the welding will hardly occur.

The construction of this embodiment has no slanting surface. A rear face 101b (102b) of the end portion of the face sheet 101 (102) is directed toward side of the opposite face sheet 102 (101) and are overlapped on the horizontal faces 122b. The thickness of this end portion is thicker than that of the face sheet 101 (102). This structure can be applied to the other embodiments.

In the above stated embodiments, "the face sheets (or the outer faces) being in parallel" indicates an arrangement which is substantially in parallel. Further, "orthogonal to the face sheet" indicates arrangement which is substantially orthogonal to the face sheet. In the case of a railway car, the side body member and the roof body member have a circular arc shape, and so there is a possibility that the two face sheets can not be arranged in parallel. The present invention can be adapted to the above structure. Further, the present invention can be adapted to a pipe and bodies of different shapes.

In a case where the angle of the pair of vertical faces 13 and 121 is not large, they can form a V-shaped structure. To compensate for the V-shaped space, it is necessary to make the projecting portions 14, 104 and 114 larger. As a result, it is preferable for the vertical face to be a substantial vertical face, however, it can be inclined a little. At the point where the vertical face 121 meets the slanting surface 122, a face can be provided in parallel with the apex of the projecting portion 104, but this face must be small. At the joint, two projecting portions 104 and 114 are provided, however only one projection 104 (114) need be provided.

Figure 11:
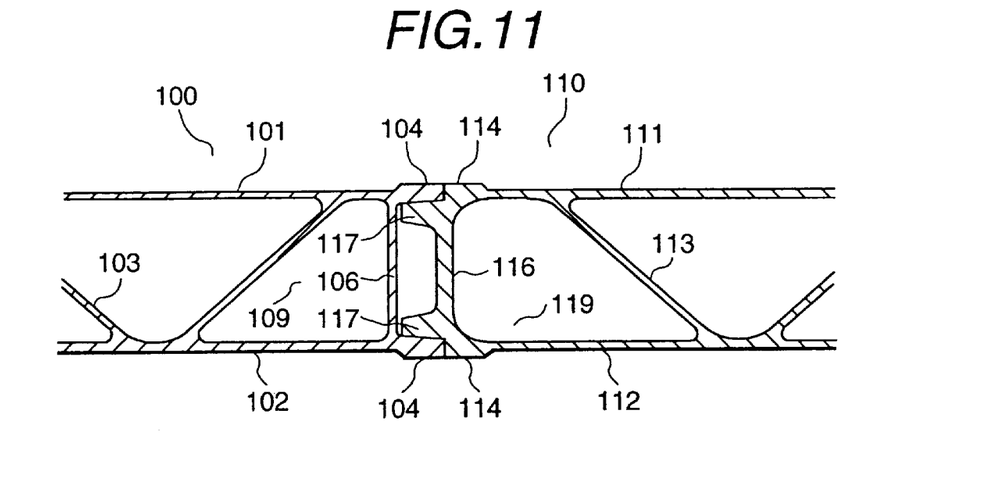
FIG. 11 is a longitudinal cross-sectional view showing a further embodiment of a joint to be welded by friction stir welding before welding thereof according to the present invention.

The embodiments shown from FIG. 11 to FIG. 13 can be adopted for a two-plane constructive body as shown in FIG. 8. Further, friction stir welding as shown from FIG. 11 to FIG. 13 can carried out simultaneously both on the upper face and the lower face, however, it also can be carried out on one side face at a time.

Figure 16:
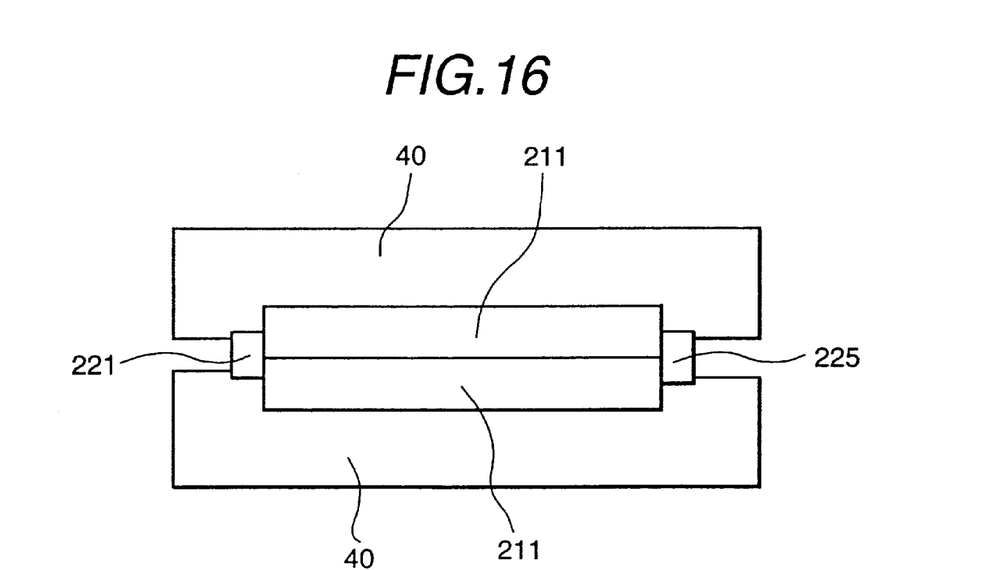
FIG. 16 is a plan view showing one embodiment of a joint during a friction stir welding according to the present invention.
Figure 17:
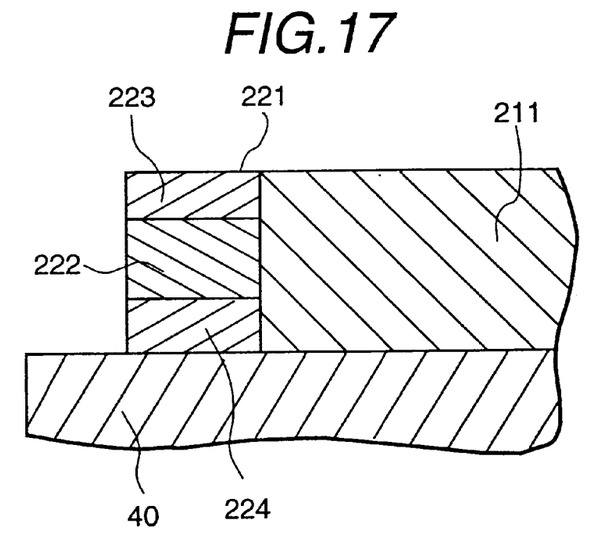
FIG. 17 is an enlarged view showing an essential portion of the joint in FIG. 16.

An embodiment as to the fourth object will be explained with reference to FIG. 16 and FIG. 17. Members to be subjected to welding, as shown from FIG. 5 to FIG. 8, are members in which both the upper face and lower face are welded substantially simultaneously, and, for example, they are thick extruded frame members 211. Abutting faces of the frame members 211 may have a configuration as shown from FIG. 11 to FIG. 15 or a configuration as shown in FIG. 18 and FIG. 21. The frame members 211 are mounted on bed stands 40 and are restricted.

Further, at end portions of a joining line of the frame members 211, by arranging tabs 221 and 225, the frame members can be restricted. These restriction forces are generated when the frame members are sandwiched by a vise and are pressed from an upper portion against the bed stands 40 using an apparatus. The tabs 221 and 225 may be pressed toward the bed stands 40 by sandwiching them using a bolt which penetrates the bed stands 40.

The clearance between the frame members 211 and the tabs 221, 225 is made as small as possible. The frame members 211 are separated into two parts, but the tabs 221 and 225 are formed by a single structure. As stated in the former embodiment, the bed stands 40 are separated into two parts. Both the frame members 211 and the frame member 211 and the tabs 221 and 225, may be welded temporally, however, in general, it is unnecessary to do so. Hereinafter, a case where no temporary welding is carried out will be explained.

The thickness of the tabs 221 and 225 is substantially the same of the thickness of the frame member 211. Since the thickness of the frame member 211 is thick, each of the tabs 221 and 225 comprises three plates. The tab 221 will be explained as a representative example. Two plates 223 and 224 are overlapped at an upper portion and a lower portion of a thick plate 222. The three plates are overlapped before the welding and are secured to the bed stands 40. The materials of the plates 223 and 224 are the same or are similar to that of the frame member 211. The plate 222 is made of an aluminum alloy or an iron system metal. It is preferable to select an aluminum alloy for the plate 222 from the aspect of transportation of the completed parts. The plate 222 also may be constituted by a hollow frame member.

When the depth of the welding bead 30 from the outer face of the frame member 211 is expressed by t10, the thickness t11 of the plates 223 and 224 is larger than the depth t10. In this case, the outer face of the tab 221 is coextensive with the outer face of the frame member 211. In a case where the projecting portion 14 (104, 114) is provided on the frame member 211, the outer face of the tab 221 is positioned at an apex of the projecting portion 14. In a case where the projecting portion 14 is provided on the frame member 211, the depth t10 corresponds to the depth of the welding bead before the cutting of the projecting portion 14. The tab 221 and the tab 225 are constituted similarly.

The plates 222, 223 and 224 are not welded to the frame member 211 before the friction stir welding is carried out, namely the plates 222, 223 and 224 are not welded temporarily to the frame member 211. At least the plate 222 is not welded to the frame member 211.

After the frame members 211 and the tabs 221, 225 are secured to the bed stands 40, the friction stir welding is carried out. By rotating the rotary body 20 from the upper portion (in the lower welding, the lower portion) of the end portion, the rotary body 20 is inserted into the tab 221 and is moved along the joint line of the frame members 211. The depth of insertion at the tab 221 installation position is similar to that of the depth of insertion at the frame members 211. After the frame members 211 are welded, the rotary body 20 is drawn out toward the upper portion (similarly, the lower portion) at the end portion of the tab 225.

Next, the securing of the frame member 211 and the tabs 221 and 225 is released, and the central thick plate 222 is removed by hammering. Next, the joint between the plates 223, 224 of the tab 221, 225 and the frame member 211 is cut off by grinding, for example, and the plates 223 and 224 are removed.

According to various experiments conducted by the inventors, the portion immediately after the start of the friction stir welding is frequently not a good weld. However, in the above stated embodiment, by arranging the tabs 221, after the good welding is and so by the time, the welding reaches the frame member 211, good welding at a beginning of the frame member 211 can be obtained. It is sufficient for the length for carrying out the friction stir welding in the tab 221 to be 30 mm.

On the other hand, when the rotary body 20 is drawn out from the frame member 211 after it has been subjected to welding, a hole which corresponds to the small diameter portion 21 is generated in the welded member. However, the rotary body 20 is drawn out at the position of the tab 225, so that, in the welded frame member 211 forming the manufactured, article no hole is generated. As a result, it is unnecessary to carry out a repair of the manufactured article.

Further, in the friction stir welding, since metals are moved by the rotary body 20 at the start point and the finish point of the welding, the thickness of the frame member is likely to thin out. However, since the welding is started at the tab 221 and the welding is finished at the tab 225, a weld having the same thickness can be obtained which extends over the whole length of the frame member 211 of the manufacturing article.

The thickness of the plates 223 and 224 of the outer face of the tabs 221 and 225 is thicker than the depth t10 of the welding bead 30. As a result, the central plate 222 is not welded. Accordingly, the plate 222 can be removed easily. Since the plate 222 is removed in advance, the cutting of the plates 223 and 224 also can be carried out easily. Further, since the plate 222 is not affected by the friction stir welding, in a case of a reuse of this plate, it is unnecessary to carry out grinding or other work. As a result, the plate 222 can be utilized repeatedly and low cost can be attained. Further, the plate 222 can be formed with a low cost material.

Even when the thickness of the plates 223 and 224 is the same to the depth t10 of the welding bead 30, and even when the plate 222 is welded, since the depth of the welding bead in the plate 222 is small, the plate 222 can be separated easily.

Further, in addition to the fact that the insertion of the rotary body 20 into the tab 221 is carried out from the upper face of the tab 221, the insertion can be performed by moving the rotary body 20 into the tab 221 from the left side face of the tab 221. Further, in the case where the rotary body 20 is drawn out from the tab 225, it can performed by moving the rotary body 20 toward the outside so as to exit from the right side face of the tab 225.

In the case where only one side face is welded, as shown in FIG. 1, only the plates 222 and 223 are needed. Further, in a case where the plates 223 and 224 are welded temporarily to the frame members 211, the need to secure the frame members 211 to the bed stand 40 will be unnecessary. The welding position can be set to correspond to the extension line of the joint line of the frame members 211.

As to the member to be subjected to welding, welding can be applied to a member having no slanting surface, a member for welding only one side, a member having a non-joining portion because of a thin plate, etc. Further, friction stir welding can be carried out from a side portion of a member.

The technical range of the present invention is not limited to the elements specifically described in each claim of the appended claims or to the wording used to describe the embodiments or for solving problems, but will include a range of understanding of one of ordinary skill in the technical field to which this invention relates.

According to the present invention, in the case where friction stir welding is applied to the welding of members, a good welding can be carried out.

What is claimed is:

1. A friction stir welding method characterized by the steps of:
   abutting an end portion of a first member having two face sheets and a rib for connecting said two face sheets and an end portion of a second member having two face sheets thereof and a rib for connecting said two face sheets thereof;
   providing a space between said rib of said end portion of said first member and said rib of said end portion of said second member; and
   carrying out a friction stir welding by inserting in said end portion a rotary body which has a larger diameter than an interval formed between said rib of said end portion of said first member and said rib of said end portion of said second member.

2. A friction stir welding method according to claim 1, wherein:

the friction stir welding is carried out in such a way that substantially the same a distance is provided from said rib of said end portion of said first member to an axial center of said rotary body as the distance from said rib of said end portion of said second member to said axial center of said rotary body.

3. A friction stir welding method according to claim 1, wherein the two face sheets of the first member are substantially parallel to each other and the two face sheets of the second member are substantially parallel to each other, the rib of the end portion of the first member is substantially perpendicular to the two face sheets of the first member, and the rib of the end portion of the second member is substantially perpendicular to the two face sheets of the second member.

4. A friction stir welding method according to claim 1, wherein the two face sheets of the first member are substantially parallel to each other and the rib of the end portion of the first member is substantially perpendicular to the two face sheets of the first member.

5. A friction stir welding method according to claim 1, wherein during the friction stir welding a load on the first and second members is supported by both the rib of the end portion of the first member and the rib of the end portion of the second member.

6. A friction stir welding method according to claim 5, wherein said load on the first and second members during the friction stir welding is applied substantially equally to the rib of the end portion of the first member and the rib of the end portion of the second member.

7. A friction stir welding method, characterized by the steps of:

abutting an end portion of a first member having two face sheets and a rib for connecting said two face sheets thereof and an end portion of a second member having two face sheets and a rib for connecting said two face sheets thereof;

providing a space between said rib of said end portion of said first member and said rib of said end portion of said second member; and carrying out a friction stir welding by inserting a rotary body in said abutting portion in such a way that substantially the same distance is provided from said rib of said end portion of said first member to an axial center of said rotary body as the distance from said rib of said end portion of said second member to said axial center of said rotary body, wherein during the friction stir welding a load on the first and second members is supported by both the rib of the end portion of the first member and the rib of the end portion of the second member.

8. A friction stir welding method according to claim 7, wherein said load on the first and second members during the friction stir welding is applied substantially equally to the rib of the end portion of the first member and the rib of the end portion of the second member.

9. A friction stir welding method according to claim 7, wherein the thickness of the rib of the end portion of the first member is equal to the thickness of the rib of the end portion of the second member.

10. A friction stir welding method according to claim 7, wherein said rotary body has a larger diameter than an interval formed between said rib of said end portion of said first member and said rib of said end portion of said second member.

11. A friction stir welding method according to claim 7, wherein the two face sheets of the first member are substantially parallel to each other and the two face sheets of the second member are substantially parallel to each other, the rib of the end portion of the first member is substantially perpendicular to the two face sheets of the first member, and the rib of the end portion of the second member is substantially perpendicular to the two face sheets of the second member.

* * * * *